United States Patent
Kondo et al.

(10) Patent No.: US 7,996,764 B2
(45) Date of Patent: *Aug. 9, 2011

(54) APPARATUS, PROGRAM AND METHOD FOR ACCEPTING A REQUEST FROM A CLIENT COMPUTER VIA A NETWORK AND EXECUTING A WEB APPLICATION

(75) Inventors: Go Kondo, Tokyo (JP); Shinichi Hirose, Tokyo (JP); Fumihiko Kitayama, Kanagawa-ken (JP); Hiroaki Nakamura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 221 days.

This patent is subject to a terminal disclaimer.

(21) Appl. No.: 12/263,081

(22) Filed: Oct. 31, 2008

(65) Prior Publication Data

US 2009/0132908 A1 May 21, 2009

Related U.S. Application Data

(62) Division of application No. 10/896,339, filed on Jul. 21, 2004, now Pat. No. 7,454,703.

(30) Foreign Application Priority Data

Jul. 31, 2003 (JP) ................................ 2003-283501

(51) Int. Cl.
G06F 17/00 (2006.01)
G06F 15/16 (2006.01)

(52) U.S. Cl. ........ 715/234; 715/204; 715/744; 715/749; 709/203

(58) Field of Classification Search .......... 715/200–205, 715/234, 235, 236, 238, 239, 243, 253, 255, 715/273, 700, 760, 207–210, 226, 231, 256, 715/274–276, 731, 744, 749, 762; 709/201, 709/202, 203, 206, 207, 217, 219
See application file for complete search history.

(56) References Cited

U.S. PATENT DOCUMENTS 5,649,131 A 7/1997 Ackerman et al.
(Continued)

FOREIGN PATENT DOCUMENTS

JP 2000082039 3/2000
(Continued)

OTHER PUBLICATIONS

Information Processing, Jun. 2001, pp. 576-581, vol. 42, No. 6.
(Continued)

*Primary Examiner* — Maikhanh Nguyen
(74) *Attorney, Agent, or Firm* — Scully, Scott, Murphy & Presser, P.C.; Vazken Alexanian

(57) ABSTRACT

A web application server executes a process appropriately also with respect to an access from a terminal device which was not recognized by the web application when the application was designed. The web application server includes a DLG file storage unit 12 having stored a DLG file in which a business logic of the web application is described in a definition in an abstract representation, a DLG execution unit 13 for using this DLG file and executing a business process of the web application in response to a request from a client, a view specializer 14 for generating a view consistent with attributes of the client with JSP based on a result of the process by the DLG execution unit 13, and a response generation unit 16 for using the view with a JSP file generated at the view specializer 14 to generate and return a response to the client.

5 Claims, 15 Drawing Sheets

U.S. PATENT DOCUMENTS

| | | | |
|---|---|---|---|
| 6,327,628 B1 | 12/2001 | Anuff et al. | |
| 6,697,849 B1 | 2/2004 | Carlson | |
| 6,766,333 B1 | 7/2004 | Wu et al. | |
| 6,782,508 B1 | 8/2004 | Bahrs et al. | |
| 6,880,126 B1 | 4/2005 | Bahrs et al. | |
| 6,901,554 B1 | 5/2005 | Bahrs et al. | |
| 6,950,850 B1 | 9/2005 | Leff et al. | |
| 6,973,619 B1 | 12/2005 | Hirose et al. | |
| 6,993,713 B2 | 1/2006 | Wendt | |
| 7,000,185 B1* | 2/2006 | Murren et al. | 715/203 |
| 7,000,218 B2 | 2/2006 | Gerken | |
| 7,076,766 B2 | 7/2006 | Wirts et al. | |
| 7,080,350 B2* | 7/2006 | Saimi et al. | 717/100 |
| 7,093,243 B2* | 8/2006 | Bailey et al. | 717/166 |
| 7,096,455 B2* | 8/2006 | Santiago | 717/114 |
| 7,162,687 B2 | 1/2007 | Pelegri-Lopart et al. | |
| 7,315,613 B2* | 1/2008 | Kleindienst et al. | 379/88.13 |
| 7,516,440 B2* | 4/2009 | Upton | 717/106 |
| 7,603,403 B2* | 10/2009 | Banerjee et al. | 709/203 |
| 2002/0029296 A1 | 3/2002 | Anuff et al. | |
| 2002/0120859 A1 | 8/2002 | Lipkin et al. | |
| 2002/0194267 A1 | 12/2002 | Flesner et al. | |
| 2003/0088617 A1 | 5/2003 | Clark et al. | |
| 2003/0093465 A1* | 5/2003 | Banerjee et al. | 709/203 |
| 2003/0105884 A1 | 6/2003 | Upton | |
| 2003/0110315 A1* | 6/2003 | Upton | 709/328 |
| 2003/0229683 A1 | 12/2003 | Oshima et al. | |
| 2003/0229849 A1 | 12/2003 | Wendt | |
| 2004/0122659 A1* | 6/2004 | Hourihane et al. | 704/9 |
| 2004/0205550 A1 | 10/2004 | Gerken | |
| 2005/0086631 A1 | 4/2005 | Naraike et al. | |

FOREIGN PATENT DOCUMENTS

| | | |
|---|---|---|
| JP | 2003058414 | 2/2003 |
| JP | 2003514283 | 4/2003 |
| WO | 98/15091 | 4/1998 |
| WO | 0227543 | 4/2002 |

OTHER PUBLICATIONS

Pelgri-Llopart et al., JavaServer Pages Specification, Sun Java Software, A division of Sun Microsystems, Inc. Nov. 1999, pp. 1-158.

Krasner et al., A Description of the Model-View Controller Using Interface Paradigm in the Smalltalk-80 System, ParcPlace Systems, Inc., 1998, pp. 1-34.

Lin et al. A Java-Based Method for Developing Web Application System, Fifth Asia-Pacific Conference on Communications and Fourth Optoelectronics and Communications Conference, Oct. 1999, pp. 1079-1082, vol. 2.

Leff et al. Web-Application Developmental Using the Model/View/Controller Design Pattern, IEEE, Sep. 2001, pp. 118-127.

Betz et al. Developing Highly-Responsive User Interface with DHTML and Servlets, IEEE, Feb. 2000, pp. 437-443.

Sun Microsystems, IPante Application Server 6.0 White Paper, Technical Reference Guide, May 25, 2000.

McReynolds et al., Accessing Web DataWindows with Java Server Pages Using Custom Tags, Feb. 2001, pp. 1-16.

E. Burke, A JSP Tag for XML + XSLT, OCI Educational Services, Sep. 2000, pp. 1-7.

Roth et al., JavaServer Pages Specification Version 2.0, Online, Dec. 2003, Sun Microsystems Inc., pp. 1-7.

Ping et al., Transforming Legacy Web Applications to the MVC Architecture, IEEE, Sep. 2003, pp. 1-10.

Naughton et al., Java: The Complete Reference, McGraw-Hill Osborne Media, 3rd Edition, Mar. 29, 1999, Chapters 6, 21, 22 and 23, pp. 1-31.

Dharma, Software Technology for Adapting Contents to Various Internet Terminals, Information Processing, Jun. 2001, pp. 576-581, vol. 42, No. 6.

* cited by examiner

Fig. 3

(A) Hello.dlg

```
<html>
<head>
<model>
<submitInfo action="gotoWorld" id="gotoWorldSubmitInfo" method="POST"/>
</model>
<body>
<submit submitInfo="gotoWorldSubmitInfo"><caption>Go to World</caption></submit>
</body>
</html>
```

(B) World.dlg

```
<html>
<head>
<title>World</title>
</head>
<body>
<p>Hellow, World!</p>
</body>
</html>
```

Fig. 4 controller.xml

```
<controller>
<dialog label="Hello" href="Hello.dlg"/>
<dialog label="World" href="World.dlg"/>
<transition from="Hello" requestName="gotoWorld">
    <default to="World"/>
</transition>
</controller>
```

Fig. 5

(A) MSIE/Hello.jsp

```
<%@page language="java"%>
<%@taglib uri="/WEB-INF/struts-html.tld" prefix="html"%>
<html>
<body>
<html:form action="MSIE/gotoWorld"><html:submit value="Go to World"/></html:form>
</body>
</html>
```

(B) MSIE/World.jsp

```
<%@page language="java"%>
<html>
<body>
<p>Hello, World!</p>
body>
</html>
```

Fig. 6 struts-config.xml

```
<struts-config>
<action-mappings>
<action path="/MSIE/gotoWorld" forward="/MSIE/World.jsp"/>
</action-mappings>
</struts-config>
```

Fig. 7

```
<webapp>
<servlet>
<servlet-name>dlg</servlet-name>
<servlet-class>
com.ibm.hopi.runtime.struts.DLGServlet
</servlet-class>
...
</servlet>
<servlet-mapping>
<servlet-name>dlg</servlet-name>
<url-pattern>*.dlg</url-pattern>
</servlet-mapping>
...
<welcome-file-list>
<welcome-file>Hello.dlg</welcome-file>
</welcome-file-list>
</webapp>
```

Fig. 8 struts-config.xml

```
<struts-config>
<action-mappings>
<action path="/gotoWorld" forward="/World.dlg"/>
</action-mappings>
</struts-config>
```

Fig. 10

MSIE/Hello.jsp

```
<%@page language="java"%>
<%@taglib uri="/WEB-INF/struts-html.tld" prefix="html"%>
<html>
<body>
<html:form action="gotoWorld"><html:submit value="Go to World"/></html:form>
</body>
</html>
```

Fig. 11

Response based on MSIE/Hello.jsp

```
<html>
<body>
<form action="/HelloWorldApp/gotoWorld.do">
<input type="submit" value="Go to World"/>
</form>
</body>
```

Fig. 12 hello.jsp

```
<%@ taglib uri="http://jakarta.apache.org/taglibs/i18n-1.0" prefix="i18n" %>
<i18n:setLocale value=<%= request.getLocale().toString() %>/>
<i18n:bundle baseName="MyResource"/>
<HTML>
<BODY>
<i18n:message key="MSG_HELLO"/>
</BODY>
</HTML>
```

Fig. 13

MyResource_ja.properties

```
MSG_HELLO=¥u3053¥u3093¥u306b¥u3061¥u306f
```

Fig. 14 hello_ja.jsp

```
<HTML>
<BODY>
こんにちは
</BODY>
</HTML>
```

APPARATUS, PROGRAM AND METHOD FOR ACCEPTING A REQUEST FROM A CLIENT COMPUTER VIA A NETWORK AND EXECUTING A WEB APPLICATION

CROSS-REFERENCE TO RELATED APPLICATIONS

This application is a divisional of U.S. Ser. No. 10/896,339, filed on Jul. 21, 2004, now U.S. Pat. No. 7,454,703, the entire contents of which are incorporated herein by reference.

FIELD OF THE INVENTION

The present invention relates to a web application server for accepting a request from a client via a network and executing a web application, and an information processing method thereof.

BACKGROUND ART

As network environments, such as the Internet, have been well-established, a web application has become popular which is operated by utilizing a browser on a web-based network system. In order to realize the web application, functions are required for generating a web page dynamically at a server in response to a request from a client, e.g. a browser, and sending the web page to the client. As general means for that, there is JSP (Java® Server Pages) which utilizes Java® (a trademark of Sun Microsystems, Inc., USA) language to realize the dynamic generation of the web page.

Today, there are a very large variety of types of terminals connectable to the Internet. Therefore, also at the web application, it has been required to execute an appropriate process corresponding to the type of the terminal device which attempts to utilize the web application.

Multi-device Authoring Technology ("MDAT") of International Business Machines Corporation, USA, enables a web application to communicate with various terminals by using appropriate JSP and actions. (for example, see "Everyplace Toolkit for WebSphere Studio", http://www-3.ibm.com/software/pervasive/products/mobile_apps/everyplace_toolkit.shtml., searched on Jul. 15, 2003).

MDAT is based on an architecture referred to as JSP Model 2, and provides a web application development technology for various kinds of terminals in accordance with MVC (Model, View, Control) model. A web application based on the MVC model comprises a model for describing a business logic, a view for describing a design of data presentation and user input, and a controller for describing a cooperative control for the request from the client and a business process. For example, a definition in abstract representation is used for a model; JSP for a view; a servlet for a controller.

In order to adapt a web application to the various kinds of terminals, it is necessary to provide a plurality sets of JSP, for example, in a view. In MDAT, a JSP file (a view) is generated automatically by a view specializer, based on the abstract representation referred to as a dialog which is not specialized for any particular terminal device. In this case, a terminal which communicates with the application should be previously designated. The view specializer acquires attributes of the designated terminal (used markup language, screen size, number of displayable colors and the like) from a profile database, and generates an appropriate JSP file.

In this way, the MDAT assumes that types of terminals are known at the time of designing a web application to which the terminals access.

As described above, in order to appropriately execute a process by a web application in accordance with a type of a terminal, it is necessary to provide a view corresponding to the type of the terminal. However, it will incur increase in burden on web application development to generate views corresponding to all of the very large variety of types of the terminals which are potentially connectable to the web application through the Internet.

Since the types of terminals connectable to the Internet have increased day by day, it is difficult to accommodate terminals which are not known when a web application is designed.

As a method for accommodating a request from a new terminal, it may be contemplated to generate, at once, all views necessary for a web application when an application server accepts a first request from the terminal.

However, it requires considerable response time for the first request from the terminal.

Moreover, for some types of terminals, which use only (or may not use more than) a part of functions of the web application, if views corresponding to the whole functions of the web application are created, it becomes wasteful since the views are also created with respect to such functions which are not used, according to the design of the web application.

It should be noted that, of course, the above described problem holds true also in the case of using a method other than the JSP as a method for generating views of web applications.

SUMMARY OF THE INVENTION

The present invention provides a web application server which appropriately executes process not only for a request from a known terminal but also a request from a terminal which was not recognized when the web application was designed, thereby reduces the burden on the web application development.

The present invention also enables the web application server to efficiently and quickly respond to a request from such unknown terminal.

The web application server accepts a request from a client via a network and executes a web application, and includes: a unit for storing an abstract view definition independent of a client's attribute; a unit for executing a process with respect to the request from the client in accordance with the abstract view definition; a unit for generating a view corresponding to the client's attribute based on a result of the process by the execution unit; and a unit for generating a response to the client in accordance with the view generated by the generating unit. The attributes means a type of the client which depends on a specification in connection with the data presentation in the client. Typically it may include used markup language, screen size, number of displayable colors or the like.

The view generation unit may generate the view with JSP.

A destination of a hyperlink included in the generated view, is preferably the abstract view. As the abstract view, it is possible to use view definition in an abstract representation irrespective of a system configuration of a particular client, or a view described with internationalized JSP. The web application server may further include a unit for storing the generated view to enable the view to be reused by the response generating unit.

Another web application server according to the present invention includes: means for executing a business process of a web application in accordance with a definition in an abstract representation irrespective of attributes of a client;

means for generating a JSP file consistent with the attributes of the client based on a result of the executed business process; and means for returning a response to the client in accordance with the generated JSP file.

Yet another web application server according to the present invention includes: means for storing a definition in an abstract representation irrespective of attributes of a client; means for executing a process with respect to a request from the client in accordance with the definition; means for generating a template which enables a result of the process to be displayed on the client; and means for generating, in accordance with the template, a response for enabling the client to display the result of the process.

Furthermore, the present invention is also realized as an information processing method for accepting a request from a client and executing a business process by a web application, by means of a computer connected to a network, which is configured as will be described below. The information processing method includes: step for accepting a request from a client, step for executing a business process by a web application using a definition in an abstract representation irrespective of attributes of the client, step for generating a template for allowing a result of the business process to be displayed on the client, step for storing the template in a storage, and step for generating a response to the request in accordance with the template stored in the storage.

The present invention is also realized as a program for controlling and allowing a computer to function as the web application server, or a program for allowing the computer to execute the process corresponding to each step in the information processing method. This program may be provided by storing and distributing it in a magnetic disk or an optical disk, a semiconductor memory, or other recording medium, or by delivering it via the network, and the like.

Instead of generating views for all clients (terminals) which are potentially access to the web application, when the web application is developed, the web application server generates a view corresponding to a client each time the client sends a request to the web application, thereby enabling the web application to appropriately execute a process with respect to the request even if the terminal was not recognized by the web application when it was designed. Accordingly, it is possible to reduce burden on the web application development.

In addition, since when the web application server accepts a request from the client, it generates a view required to generate a response to the specific request, instead of generating all of the views, for the client, corresponding to the whole functions of the web application, thereby realizing efficient and quick response.

BRIEF DESCRIPTION OF THE DRAWINGS

FIG. 3 shows an example of a DLG file used in the web application server;

FIG. 4 shows an example of an XML file in which functions of a DLG execution unit is described;

FIG. 5 shows an example of JSP files in a conventional approach in which JSP files for the whole functions of a web application are generated at the time of web application design or when a request is accepted from a terminal;

FIG. 6 shows an example of a Struts configuration file in the conventional approach;

FIG. 7 shows an example of a web application placement descriptor in the web application in accordance with the present invention;

FIG. 8 shows a Struts configuration file (struts-config.xml) generated when the web application is designed in accordance with the present invention;

FIG. 10 shows a JSP file generated in accordance with the DLG file of FIG. 3(A) according to the present invention;

FIG. 11 shows an example of a response to a terminal, generated by a response generation unit according to the present invention;

FIG. 12 shows an example of an internationalized JSP file used in another embodiment of the present invention;

FIG. 13 shows an example of a Japanese resource used in an embodiment according to the present invention;

FIG. 14 shows an example of localizing the internationalized JSP file of FIG. 12 by means of the Japanese resource of FIG. 13;

DETAILED DESCRIPTION OF THE PREFERRED EMBODIMENT

A best mode for carrying out the present invention (hereinafter referred to as "embodiment") will be described in detail below with reference to the accompanying drawings.

The invention is realized as a web application server for accepting a request from a client via a network such as the Internet, and executing a process by a web application to return a response to the client. Here the client is a terminal (a personal computer, a PDA (Personal Digital Assistant), a cellular phone or the like) for executing software which may utilize the web application, which will be referred to as "terminal" in the following description. The word "terminal" may mean hardware and/or software which access the web application server and send a request to the server. For example, Internet Explorer, which is an Internet browser of Microsoft Corporation, USA, may be a terminal. Also an information device which includes the browser and hardware to run the browser may be a terminal.

Figure 1:
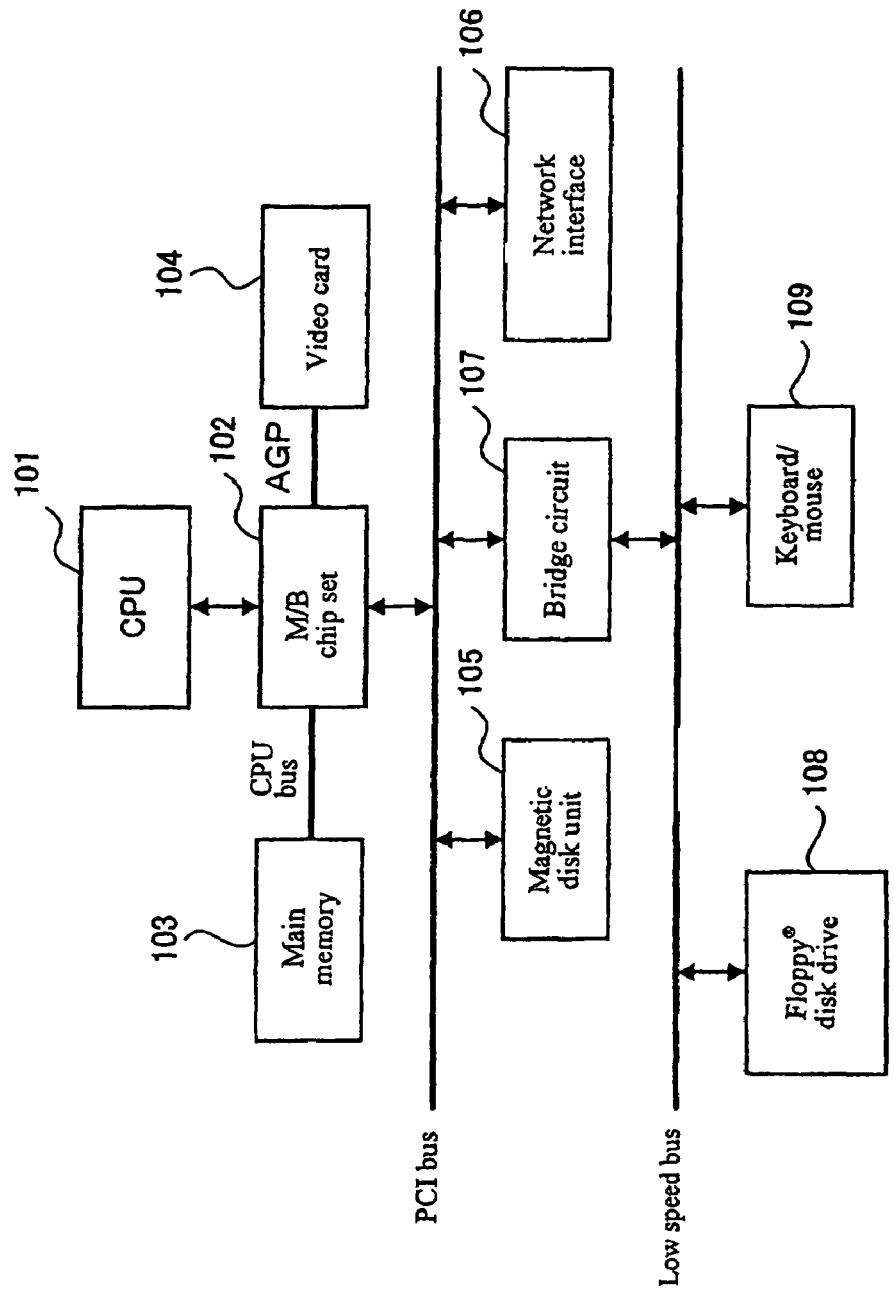
FIG. 1 shows an example of a hardware configuration of a computer preferable for realizing a web application server according to the present invention.

FIG. 1 shows an example of a hardware configuration of a computer p FIG. 1 shows an example of a hardware configuration of a computer preferable for realizing a web application server according to the present invention.

The computer includes a CPU (Central Processing Unit) 101, a main memory 103 connected to the CPU 101 via a M/B (Motherboard) chip set 102 and a CPU bus, a video card 104 also connected to the CPU 101 via the M/B chip set 102 and an AGP (Accelerated Graphics Port), a magnetic disk unit (HDD) 105 and a network interface 106 connected to the M/B chip set 102 via a PCI (Peripheral Component Interconnect) bus, and a floppy disk drive 108 and a keyboard/mouse 109 connected to the M/B chip set 102 via a bridge circuit 107 and a low speed bus such as an ISA (Industry Standard Architecture) bus from the PCI bus.

It should be noted that FIG. 1 only illustrates an example hardware configuration of the computer for realizing this embodiment, and it is possible to take other various configurations if this embodiment is applicable to them. For example, instead of providing the video card 104, only a video memory may be mounted to have a configuration for processing image data in the CPU 101, and as an external storage device, a drive for a CD-R (Compact Disc Recordable) or a DVD-RAM (Digital Versatile Disc Random Access Memory) may be provided via an interface such as an ATA (AT Attachment) or a SCSI (Small Computer System Interface).

Figure 2:
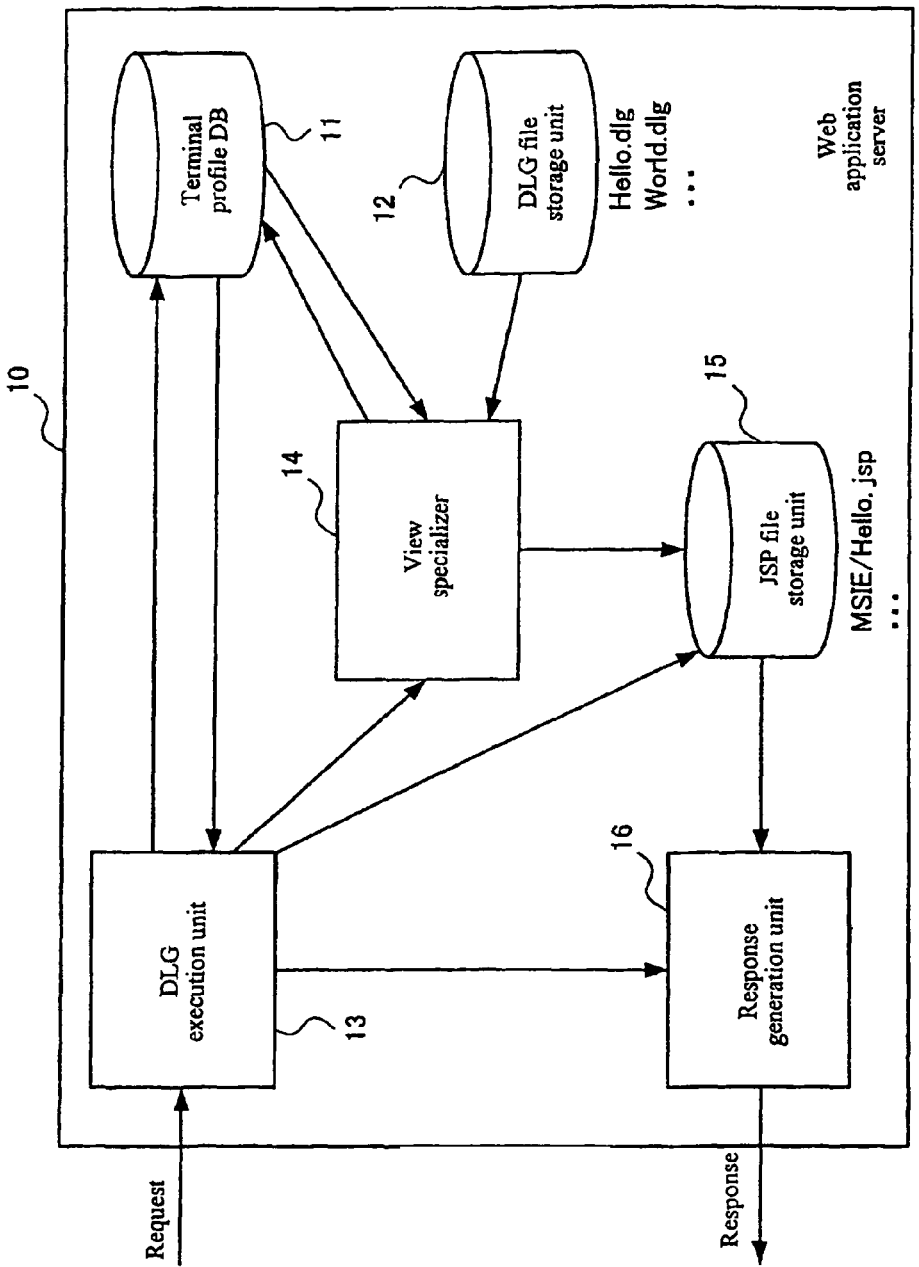
FIG. 2 shows a functional configuration of the web application server according to the present invention.

FIG. 2 shows a functional configuration of a web application server 10 according to the present invention.

The web application server 10 includes a terminal profile DB (database) 11 for storing attributes of various kinds of terminals (client, User-Agent), a DLG file storage unit 12 for storing a dialog file (hereinafter referred to as "DLG file") in which the web application is described in an abstract representation independent of a type of a terminal, a DLG execution unit 13 and a view specializer 14 for dynamically generating JSP when the web application is executed, a JSP file storage unit 15 for storing the generated JSP, and a response generation unit 16 for interpreting a JSP file and generating a response consisting of an HTML document and the like. The response generation unit 16 further sends the response to a terminal which sends a request to the web application server.

Among the above described configuration, the terminal profile DB 11, the DLG file storage unit 12 and the JSP file storage unit 15 are realized, for example, in the main memory 103 or the magnetic disk unit 105 of the computer shown in FIG. 1. In addition, the DLG execution unit 13, the view specializer 14 and the response generation unit 16 are realized, for example, by the program-controlled CPU 101 of FIG. 1. The program for controlling the CPU 101 may be provided by storing and distributing it in a magnetic disk or an optical disk, a semiconductor memory, or other recording medium, or by delivering it via the network, and the like.

The terminal profile DB 11 stores attributes, with respect to the various kinds of terminals which may access the web application server 10 to utilize the web application. Contents of the terminal profile DB 11 is updated as needed according to increase in the number of types of the terminals which may access the web application server 10.

The DLG file storage unit 12 stores a DLG file in which functions of the web application provided by the web application server 10 are described in the abstract representation (dialog) independent of the terminal attribute. This DLG file is a view definition (abstract view), which describes a view for displaying contents or a result of a business process in the web application on the client, in the abstract representation independent of a display form at the individual client.

The DLG execution unit 13 is a DLG servlet (controller) for accepting a request (an HTTP request and the like) with respect to the web application from a terminal, executing the process with respect to the request at the level of dialog, and controlling generation of the JSP file corresponding to the terminal. That is, the DLG execution unit 13 is business process execution means for executing the business process by the web application in accordance with the DLG file as the abstract view. Specifically, the DLG execution unit 13 first interprets and executes the request from the terminal at dialog level, identifies the DLG file required for the response, and acquires key information for identifying the terminal (User-Agent), from description at a User-Agent field in a request header and the like. Then, the DLG execution unit 13 gives the information to the view specializer 14 to cause it to generate the corresponding JSP file. In addition, the DLG execution unit 13 also forwards the request and the key information accepted from the terminal to the response generation unit 16.

The view specializer 14 reads the DLG file identified at the DLG execution unit 13 from the DLG file storage unit 12, uses the key information acquired also from the DLG execution unit 13, and retrieves the terminal profile DB 11 to acquire the attribute on the corresponding terminal. Then the view specializer 14 converts the read DLG file into the JSP file which is the view specialized to the terminal. That is, the view specializer 14 is view generation means for generating the JSP file which is the view specialized to the attributes of the particular terminal, from the DLG file which is the abstract view irrespective of the attributes of the particular terminal. The JSP file generated at the view specializer 14 is stored in the JSP file storage unit 15 as a template to be used to generate the response to the terminal.

In this embodiment, when the request is accepted from the terminal, instead of generating all of the JSP files, for the terminal, corresponding to the whole functions of the web application, only the JSP file required for responding to the request from the terminal is generated. Then, if a link to another JSP file exists in the generated JSP file, and the another JSP file which is a link destination has not been generated yet, it is not possible to execute normally to define the link destination and generate the JSP file just as is the case with generating the JSP files for the whole functions of the web application. Accordingly, it would be a problem how to reflect the link among the DLG files or transition to the DLG file, in the JSP file. This invention solves this problem by having the link in the generated JSP file as the link to the DLG file instead of the JSP file. This method will be described in detail with a specific example.

The JSP file storage unit 15 stores the JSP file generated at the view specializer 14. The stored JSP file may be reused if the same request is accepted from a terminal of the same type. That is, with respect to the second and subsequent requests from a terminal of the same type, it would not be required to generate a JSP file anew.

The response generation unit 16 is a JSP servlet for accepting the request and the key information from the terminal, from the DLG execution unit 13, reading the JSP file corresponding to the request from the JSP file storage unit 15, generating the response with respect to the request (an HTTP response and the like), and returning the response to the terminal.

Next, specific examples of the files will be presented in order to describe operation of this embodiment.

Assume that the DLG files (Hello.dlg and World.dlg) shown in FIG. 3 are stored in the DLG file storage unit 12, and also functions of the DLG execution unit 13 is described in an XML file (controller.xml) shown in FIG. 4. Based on the Hello.dlg, Hello.jsp is generated for a terminal, and similarly World.jsp is generated based on the World.dlg. The web application presents a string "Hello, World!" on a display of the terminal by transiting from a web page based on the Hello.jsp to the World.jsp.

Here for comparison, it will be shown what kind of files are generated in the conventional case that the JSP files for the whole functions of the web application are generated when the web application is designed or when the request is accepted from the terminal. Assuming that the terminal is identified with the key information "MSIE", from the DLG file shown in FIG. 3, both the JSP files (MSIE/Hello.jsp and MSIE/World.jsp) shown in FIG. 5 are generated, and Struts configuration file (struts-config.xml) shown in FIG. 6 is also generated. Then, with these JSP files and the Struts configuration file, the response (an HTML file) based on the attributes of the terminal identified with the key information "MSIE" is generated to be returned to the terminal.

In contrast, according to the present invention, only a necessary JSP file is generated each time a request from a terminal is accepted. That is the World.jsp has not been generated yet at the point when the Hello.jsp is generated from the Hello.dlg. However, if the Struts configuration file is generated as shown in FIG. 6, it cannot be executed, which causes an error. That is, if gotoWorld action is invoked from the web page based on the Hello.jsp, the page is forwarded to the World.jsp, which is still a nonexistent file at this point. To circumvent this, the World.jsp is generated first from the World.dlg before executing the gotoWorld action.

To realize the above, dialog is placed, instead of the JSP file, in the web application. Accordingly, all links (a welcome file, a static link such as A tag in the HTML, forward and redirect as a result of the action, and the like) in the web application are directed to the dialog, instead of the JSP file.

FIG. 7 shows an example of a web application placement descriptor in the web application constructed according to the present invention.

As described above, if a file extension of the DLG file is "dlg", and a class of the DLG servlet is com.ibm.hopi.runtime.struts.DLGServlet, its web application placement descriptor will become as shown in FIG. 7.

In addition, FIG. 8 shows the Struts configuration file (struts-config.xml) generated when the web application is designed.

In comparison with the Struts configuration file of FIG. 6, the Struts configuration file of FIG. 8 includes "/gotoWorld" as an input for "action path="; "World.dlg"/ for "forward=", instead of "MSIE/gotoWorld" and "MSIE/World.jsp" both of which depend on the key information "MSIE".

Since this Struts configuration file does not depend on a particular terminal, it can be written when the web application is developed.

Figure 9:
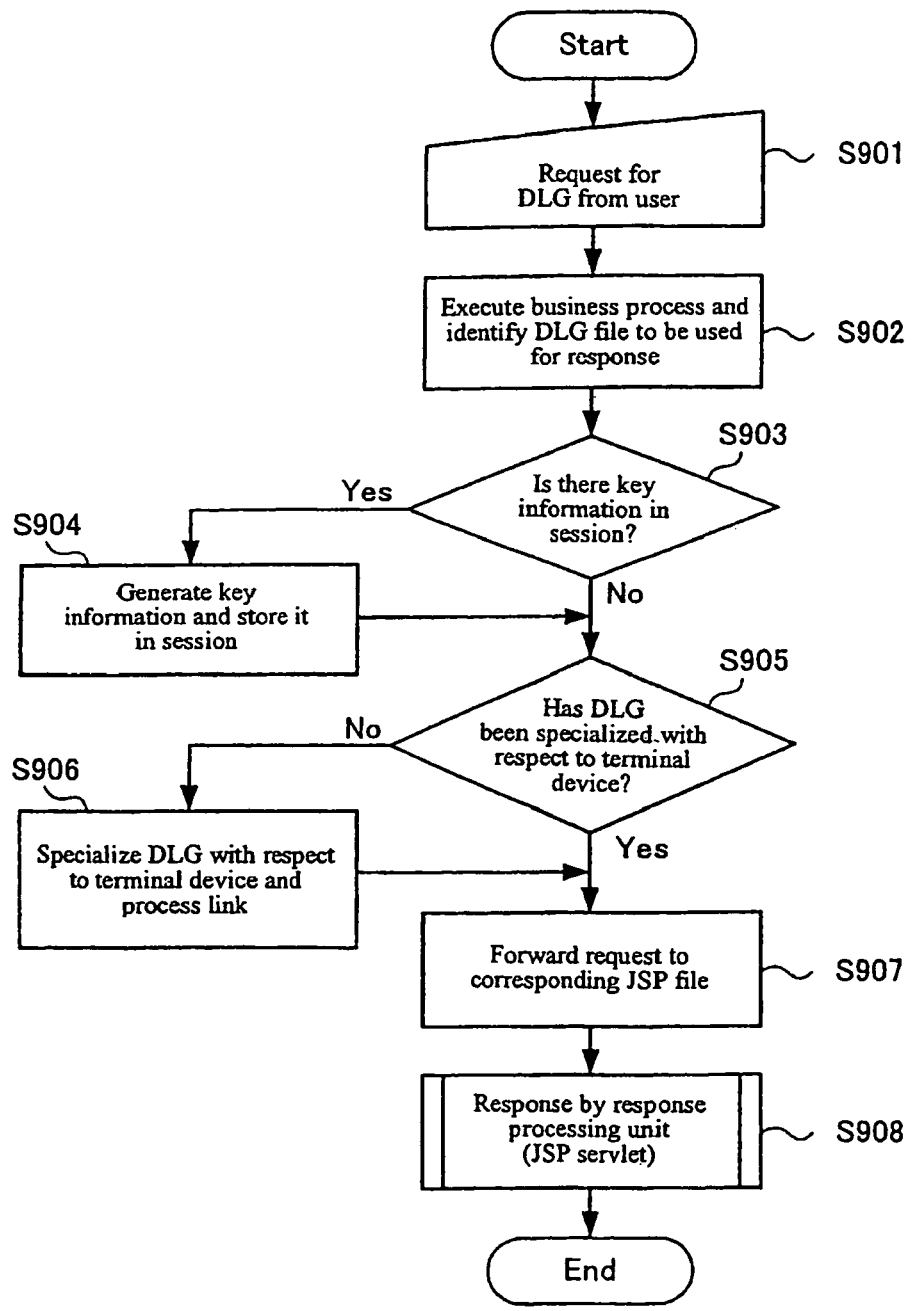
FIG. 9 is a flowchart showing an operation of the DLG execution unit in accordance with the present invention.

FIG. 9 is a flowchart showing the operation (doGet and doPost methods) in the case where the DLG servlet as shown in FIG. 7, that is, the DLG execution unit 13 accepts a request from a terminal.

The DLG execution unit 13 first accepts the request from a terminal (User-Agent) (step 901). Though this request is the request with respect to the DLG file, the DLG file is not necessarily requested directly, and it may be requested indirectly by the DLG file which was previously defined as the welcome-file when a root of the web application was accessed, or the DLG execution unit 13 itself as the controller servlet may forward the request to the DLG file as a result of a business logic.

When the DLG execution unit 13 received the request to the DLG file, it processes the request in accordance with a ServletMapping defined in the web application. Thereby, the DLG file to be used for the response with respect to the request is identified (step 902). Further, the DLG execution unit 13 examines whether there is the key information for identifying the type of the terminal, in a session object configured with respect to a session involving the request (step 903). Then, if there is no key information (that is, the first request is received in a new session), the DLG execution unit 13 uses a string in a User-Agent header included in the request to query the terminal profile DB 11, creates the key information, and stores it in the session object (step 904).

If the key information is acquired from the session object at step 903, or once the key information is created at step 904, the DLG execution unit 13 uses the key information to retrieve the JSP file storage unit 15, and examines whether the DLG file identified at step 902 has been specialized with respect to the terminal, that is, whether the JSP file, which corresponds to the DLG file and is specialized to the terminal, has been already generated (step 905). If the corresponding JSP file is not stored in the JSP file storage unit 15, the DLG execution unit 13 instructs the view specializer 14 to generate a JSP file.

The view specializer 14 acquires the key information and the information for identifying the DLG file from the DLG execution unit 13, acquires the attribute information on the corresponding terminal from the terminal profile DB 11 based on the key information, and also reads the DLG file identified at step 902 from the DLG file storage unit 12. Then based on the attribute on the terminal acquired from the terminal profile DB 11, the view specializer 14 converts the DLG file read from the DLG file storage unit 12 into the JSP file specialized to the terminal (step 906).

Though the JSP file generated accordingly includes many links corresponding to application flows, in this embodiment as described above, DLG file is used for the link destination instead of the JSP file. The information for identifying the DLG file of the link destination may be obtained in the process of step 902, for example.

FIG. 10 shows the JSP file which is converted and generated from the DLG file of FIG. 3(A).

FIG. 10, as is the case with FIG. 5, shows the JSP file in the case where the terminal was identified with the key information "MSIE". In comparison with the JSP file of FIG. 5(A), it can be seen that the forward destination of the action is not limited to the terminal identified with the key information "MSIE".

The JSP file generated as described above is stored in the JSP file storage unit 15.

If a desired JSP file has already existed at step 905, or after the JSP file is generated at step 906, the response generation unit 16 reads the JSP file from the JSP file storage unit 15, and the DLG execution unit 13 forwards the request accepted from the terminal to the JSP file (step 907).

After that, the response generation unit 16 generates the response consisting of the HTML document and the like with respect to the request from the terminal, based on the read JSP file, and returns the response to the terminal (step 908).

FIG. 11 shows the response (HTML document) to the terminal of the key information "MSIE", generated based on the JSP file of FIG. 10, according to the present invention.

When the document shown in FIG. 11 is executed with the terminal of the key information "MSIE" (User-Agent: the Internet Explorer of Microsoft Corporation, USA), a Submit button is displayed on a display screen. When a user of the terminal clicks on this Submit button with the mouse, the gotoWorld action is invoked, and forwarding to the World.dlg which is the DLG file is executed. When the DLG execution unit 13 of the web application server 10 accepts this request, it will execute the process shown in FIG. 9. Since the key information "MSIE", which was acquired when the JSP file of FIG. 10 (MSIE/Hello.jsp) was generated from the DLG file of FIG. 3(A) (Hello.dlg), is stored in the session object, the DLG execution unit 13 may acquire the key information at step 903, and it proceeds directly to step 905 without generating the key information at step 904. If the JSP file specialized to the terminal has been already generated with respect to the DLG file Hello.dlg or the World.dlg, through the previous operation or the operation by other user by means of a similar terminal, the DLG execution unit 13 bypasses the process of step 906 and proceeds directly to step 907, since the JSP file has been stored in the JSP file storage unit 15.

As described above, according to this embodiment, when the terminal of a predetermined type attempts to utilize the web application for the first time, the JSP file specialized to the terminal is generated to respond to the terminal. Accordingly, it is not necessary to prepare the JSP files with respect to the terminals of all types which may utilize the web application, when the web application is designed, and thereby it is possible to reduce burden on web application development. In addition, also with respect to the terminal, which was not recognized when the web application was designed, it is possible to generate and accommodate the JSP file corresponding to such terminal to execute the process appropriately.

Furthermore, since this embodiment generates only the JSP file required to respond to the requested process each time, it may prevent increase in latency time, without taking a vast amount of time as is the case with generating all of the JSP files corresponding to the whole web application when the first request is accepted. In addition, this embodiment may avoid generating unnecessarily the JSP file which will not be used eventually.

Though one aspect of the present invention is to accommodate a web application to the various kinds of terminals as described above, another aspect is to prevent burdensome complexity of the controller, by executing the process directly by means of the abstract view, in the web application in which the JSP of the view part may be generated depending on the attributes of the client based on the abstract view which is an abstract definition. Therefore, the web application server 10 of the present invention is not limited to the adaptation to the various kinds of terminals, and for example, in consideration of an internationalized JSP file as the abstract representation, it also may be applied to improve execution speed in the case of generating a localized JSP file from this internationalized JSP file.

The internationalized JSP file may be generated by means of JSTL (JSP Standard Tag Library) or a tag library of the Struts. However, in this case, since the tag library is invoked with respect to each word, sentence, and paragraph, the execution speed is slow.

On the contrary, it may be contemplated to generate the localized JSP file from the internationalized JSP file by binding respective language resources when the web application is designed. For example, if there are the internationalized JSP file as shown in FIG. 12 (hello.jsp) and a Japanese resource as shown in FIG. 13 (MyResource_ja.properties), it would be better to generate the localized JSP file of Japanese as shown in FIG. 14 (hello_ja.jsp) when the web application is designed. Since texts to be bound have been decided when the web application is designed, and there is no change in those texts, a result of execution is the same as the case of using the tag library, but the execution speed is fast because the tag library is not invoked in this method.

However, in this method for generating the localized JSP file when the web application is designed, the controller must be rewritten to forward to the localized JSP. This task will become burdensome, as the number of target language and area settings (such as language environments, for example, locales in an operating system of Microsoft Corporation) will increase.

Therefore, it is contemplated to generate the localized JSP when the web application is executed.

Figure 15:
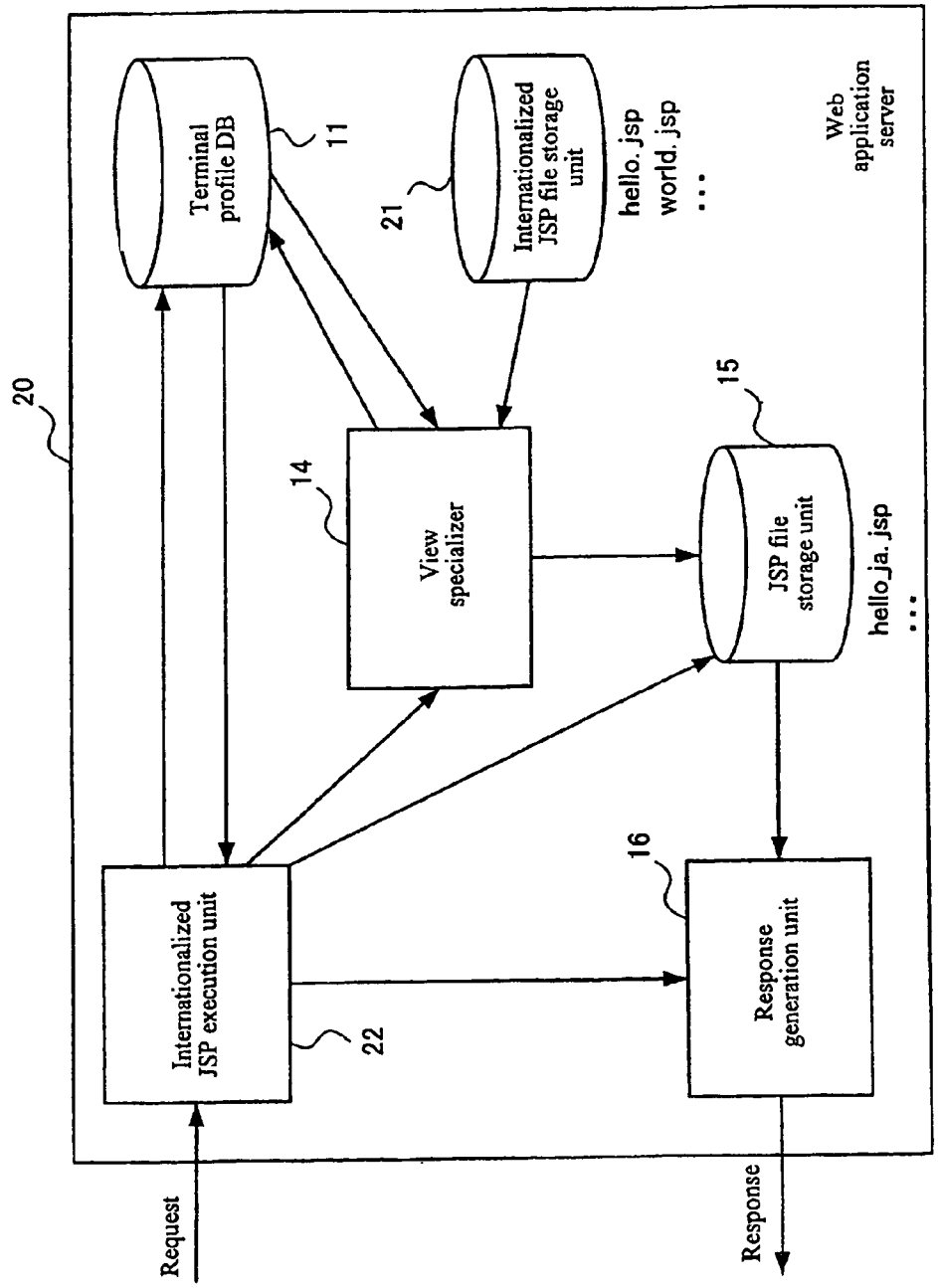
FIG. 15 shows a functional configuration of the web application server according to the another embodiment of the present invention.

FIG. 15 shows a functional configuration of the web application server for generating the localized JSP file from the internationalized JSP file with respect to the request from the terminal device and returning the response.

As described above, in this embodiment, the internationalized JSP is used as the abstract representation (abstract view) which describes the view for displaying the contents or the result of the business process on the client. Therefore, in comparison with the web application server 10 shown in FIG. 2, a web application server 20 shown in FIG. 15 is provided with an internationalized JSP file storage unit 21 for storing internationalized JSP file, instead of the DLG file storage unit 12 for storing the DLG file as the abstract view, and also it is provided with an internationalized JSP execution unit 22 for executing the process with respect to the internationalized JSP, instead of the DLG execution unit 13 for executing the process with respect to the dialog. Since other components (the terminal profile DB 11, the view specializer 14, the JSP file storage unit 15, and the response generation unit 16) are similar as components of the web application server 10 shown in FIG. 2, they are labeled with the same reference numerals as FIG. 2 and description thereof will be omitted.

In the web application server 20 shown in FIG. 15, the internationalized JSP file storage unit 21 is realized, for example, in the main memory 103 or the magnetic disk unit 105 of the computer shown in FIG. 1. In addition, the internationalized JSP execution unit 22 is realized as the functions of the program-controlled CPU 101 of FIG. 1, for example. This internationalized JSP execution unit 22 is a localized JSP servlet (controller) for accepting the request (the HTTP request and the like) with respect to the web application from the predetermined terminal device, executing the process with respect to the request at the level of the internationalized JSP, and controlling generation of the JSP file corresponding to the language and area setting of the terminal device.

Figure 16:
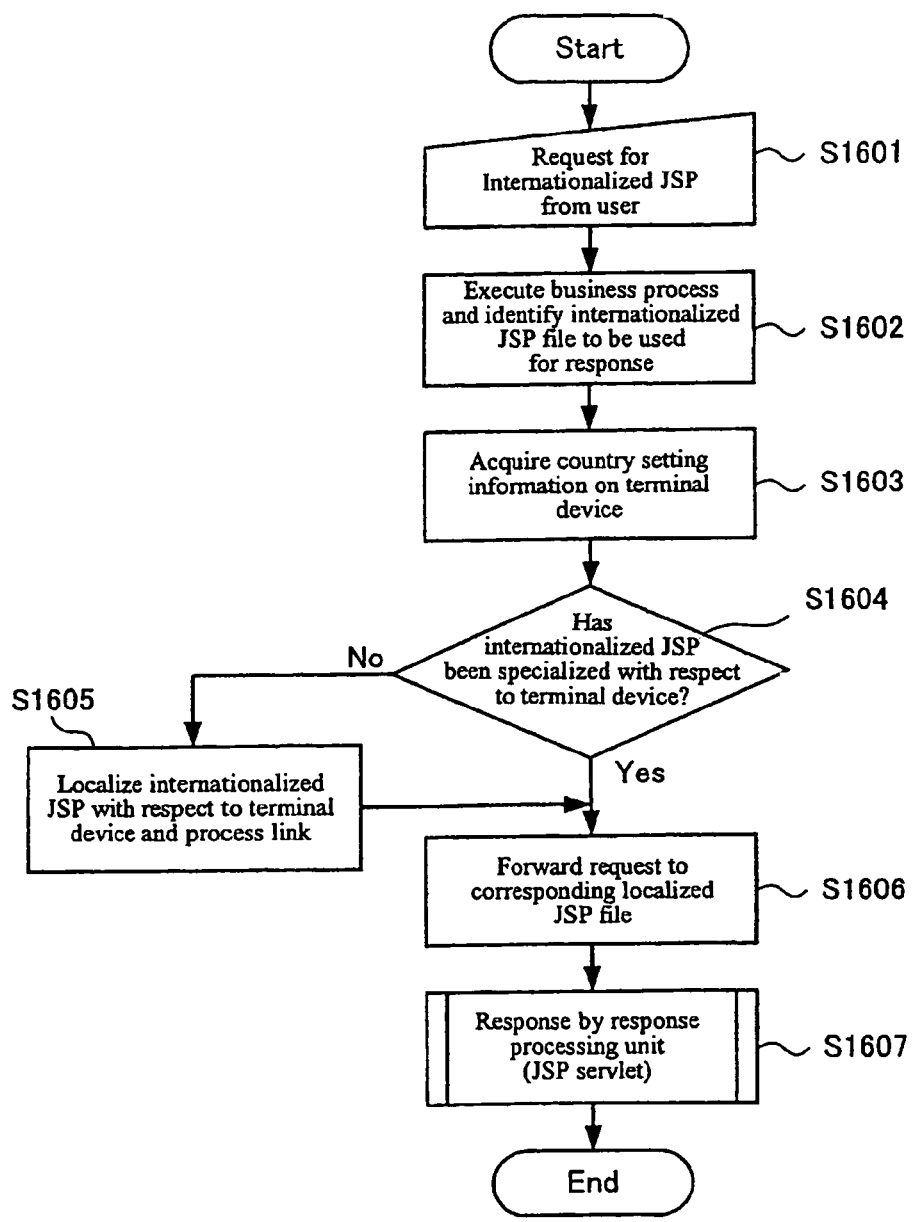
FIG. 16 is a flowchart showing the operation of an internationalized JSP execution unit.

FIG. 16 is a flowchart showing the operation of the web application server 20 in such an embodiment.

With reference to FIG. 16, the internationalized JSP execution unit 22 first accepts the request with respect to the internationalized JSP file from the predetermined terminal device (User-Agent) (step 1601).

When the internationalized JSP execution unit 22 received the request, it processes the request to this internationalized JSP file with the ServletMapping defined in the web application. Thereby, the internationalized JSP file to be used for the response with respect to the request is identified (step 1602). Further, the internationalized JSP execution unit 22 acquires information on the language and area setting of the terminal device which issued the request (step 1603). This information on the language and area setting may be obtained easily by invoking getLocale method with respect to request instance of Java®x.servlet.http.HttpServletRequest type of a first argument in the doGet method or the doPost method.

Next, the internationalized JSP execution unit 22 uses the language and area setting acquired at step 1603 to retrieve the JSP file storage unit 15, and examines whether the internationalized JSP file identified at step 1602 has been already localized with the language and area setting, that is, whether the localized JSP file corresponding to the internationalized JSP file has been generated (step 1604). If the corresponding localized JSP file is not stored in the JSP file storage unit 15, the internationalized JSP execution unit 22 instructs the view specializer 14 to generate the localized JSP file.

The view specializer 14 acquires the language and area setting and the information for identifying the internationalized JSP file, from the internationalized JSP execution unit 22, and reads the internationalized JSP file identified at step 1602 from the internationalized JSP file storage unit 21 based on the information on the language and area setting. Then the view specializer 14 converts the internationalized JSP file into the localized JSP file corresponding to the language and area setting (step 1605). Though the localized JSP file generated accordingly includes many links corresponding to the application flows, the internationalized JSP file is used for the link destination instead of the localized JSP file. The information for identifying the internationalized JSP file of the link destination may be obtained in the process of step 1602, for example.

If a desired localized JSP file has already existed at step 1604, or after the localized JSP file is generated at step 1605, the response generation unit 16 reads the localized JSP file from the JSP file storage unit 15, and the internationalized JSP execution unit 22 forwards the request accepted from the terminal device to the localized JSP file (step 1606).

After that, the response generation unit 16 generates the response consisting of the HTML document and the like with respect to the request from the terminal device, based on the read localized JSP file, and returns the response to the terminal device (step 1607).

In each of the embodiments, the controller of the web application is realized with the servlet. However, for example in a portal server, it is required to execute the process with respect to the definition in the abstract representation such as the dialog or the internationalized JSP file, by means of a Portlet, instead of the servlet. In this case, this function may be realized by means of PortalStruts. The PortalStruts provides a mechanism for enabling to freely define and extend a command (ViewCommand: hereinafter referred to as "ViewCommand") for processing the file (corresponding to the view) forwarded with the action in the controller. The process with respect to the definition in the abstract representation may be executed in the Portlet, by implementing the ViewCommand instead of the servlet by means of this mechanism. Specifically, instead of declaring the DLG servlet (the DLG execution unit 13) with the placement descriptor, a factory of the ViewCommand is declared, and the DLG file is set to generate the ViewCommand which implements an algorithm shown in FIG. 9 with execute method. As the Struts configuration file to be generated, the same file as in the embodiment of using the servlet may be used.

In this way, the present invention is not necessarily limited to the configuration of using the servlet or the JSP, as long as the configuration, in the web application in which the view part may be generated depending on the attributes of the client (terminal device) based on the abstract definition, may realize the function of executing the process directly by means of the abstract view, with respect to the request from the client, and subsequently using an appropriate view corresponding to the client to return the response to the client.

The invention claimed is:

1. An information processing method for allowing a web application server to respond to a request from a client, the method comprising the steps of:
   accepting, by the application server, a request from the client via a network;
   executing a business process by a web application in accordance with a definition in an abstract representation irrespective of attributes of the client, said executing further including interpreting and executing the request at an abstract view definition level, identifying an abstract view definition file for responding to the request, and acquiring key information for identifying user-agent of said client from description at a user-agent field in a request header of the request;
   generating a template for allowing a result of the business process to be displayed on the client, the template including at least a corresponding JSP (Java® Server Pages) file generated based on the identified abstract view definition file and the acquired key information;
   storing the generated template including the at least a corresponding JSP (Java® Server Pages) file in a storage;
   generating a response to the request from the client in accordance with the template stored in the storage; and
   wherein when the request is accepted from the client, instead of generating all of the JSP files, for the client, corresponding to the whole functions of the web application, only the JSP file required for responding to the request from the client is generated.

2. An information processing method for allowing a web application server to respond to a request from a client, the method comprising the steps of:
   accepting, by the application server, a request from a client from the client via a network;
   executing a business process by a web application in accordance with a definition in an abstract representation irrespective of attributes of the client, said executing further including interpreting and executing the request at an abstract view definition level, identifying an abstract view definition file for responding to the request, and acquiring key information for identifying user-agent of said client from description at a user-agent field in a request header of the request;
   retrieving, from a storage device, a template for allowing a result of the business process to be displayed on the client, the template including at least a corresponding JSP (Java® Server Pages) file generated based on the identified abstract view definition file and the acquired key information; generating a response to the request from the client in accordance with the retrieved template; and
   wherein when the request is accepted from the client, instead of generating all of the JSP files, for the client, corresponding to the whole functions of the web application, only the JSP file required for responding to the request from the client is generated.

3. A non-transitory readable storage medium tangibly embodying a program of instructions, said instructions executed by a machine to perform a method of allowing a web application server to respond to a request from a client, the method the steps of:
   accepting, by the application server, a request from the client via a network;
   executing a business process of a web application in accordance with a definition in an abstract representation irrespective of attributes of the client, said executing further including interpreting and executing the request at an abstract view definition level, identifying an abstract view definition file for responding to the request, and acquiring key information for identifying user-agent of said client from description at a user-agent field in a request header of the request;
   generating a template for allowing a result of the business process to be displayed on the client, the template including at least a corresponding JSP (Java® Server Pages) file generated based on the identified abstract view definition file and the acquired key information;
   storing the generated template including the at least a corresponding JSP (Java® Server Pages) file in a storage;
   generating a response to the request from the client in accordance with the template stored in the storage; and
   wherein when the request is accepted from the client, instead of generating all of the JSP files, for the client, corresponding to the whole functions of the web application, only the JSP file required for responding to the request from the client is generated.

4. The non-transitory readable storage medium according to claim 3, wherein the definition in the abstract representation is used for a link destination of a hyperlink included in the generated template.

5. A non-transitory readable storage medium tangibly embodying a program of instructions, said instructions executed by a machine to perform a method of controlling a computer allowing a web application server to respond to a request from a client, the method the steps of:

accepting, by the application server, a request from the client via a network;

executing a business process of a web application in accordance with a definition in an abstract representation irrespective of attributes of the client, said executing further including interpreting and executing the request at an abstract view definition level, identifying an abstract view definition file for responding to the request, and acquiring key information for identifying user-agent of said client from description at a user-agent field in a request header of the request;

retrieving, from a storage device, a template for allowing a result of the business process to be displayed on the client, the template including at least a corresponding JSP (Java® Server Pages) file generated based on the identified abstract view definition file and the acquired key information;

generating a response to the request from the client in accordance with the template; and wherein when the request is accepted from the client, instead of generating all of the JSP files, for the client, corresponding to the whole functions of the web application, only the JSP file required for responding to the request from the client is generated.

* * * * *